United States Patent
Kneppers et al.

(10) Patent No.: US 8,641,495 B2
(45) Date of Patent: Feb. 4, 2014

(54) DEVICE AND METHOD FOR THE REMOVAL OF A PART OF A CROP

(75) Inventors: Job Leonardus Kneppers, Den Hoorn (NL); Richard Patrick Versluijs, Delfgauw (NL); Robert Alexander Schouten, De Lier (NL); Ronald Zeelen, Delft (NL)

(73) Assignee: Prigrow Tomation B.V., Poortugaal (NL)

(*) Notice: Subject to any disclaimer, the term of this patent is extended or adjusted under 35 U.S.C. 154(b) by 536 days.

(21) Appl. No.: 12/937,879

(22) PCT Filed: Apr. 10, 2009

(86) PCT No.: PCT/NL2009/050190
§ 371 (c)(1),
(2), (4) Date: Nov. 15, 2010

(87) PCT Pub. No.: WO2009/128711
PCT Pub. Date: Oct. 22, 2009

(65) Prior Publication Data
US 2011/0053670 A1    Mar. 3, 2011

(30) Foreign Application Priority Data
Apr. 14, 2008  (NL) .................................... 2001482

(51) Int. Cl.
*A01D 45/00* (2006.01)
*A01D 46/00* (2006.01)

(52) U.S. Cl.
USPC .......................................................... 460/136

(58) Field of Classification Search
USPC ............... 56/328.1, 330, 332, 335, 337, 338, 56/14.3; 460/123, 126, 130, 136, 140; 269/3, 6, 43, 289 MR; 30/134
See application file for complete search history.

(56) References Cited

U.S. PATENT DOCUMENTS

| | | | | |
|---|---|---|---|---|
| 46,797 A | * | 3/1865 | Harris | 30/242 |
| 49,178 A | * | 8/1865 | Valentine | 30/134 |
| 201,026 A | * | 3/1878 | Locke | 460/126 |
| 1,635,569 A | * | 7/1927 | Ayars | 99/640 |
| 2,023,408 A | * | 12/1935 | Coll | 7/135 |
| 2,197,310 A | * | 4/1940 | Lincoln | 27/21.1 |
| 2,422,430 A | * | 6/1947 | Manderscheid et al. | 451/338 |
| 3,175,561 A | * | 3/1965 | Oldershaw | 460/135 |
| 3,252,463 A | * | 5/1966 | Alpen | 460/136 |
| 3,294,131 A | * | 12/1966 | Larson | 144/34.5 |
| 3,437,152 A | * | 4/1969 | Barrentine | 171/58 |
| 3,831,647 A | * | 8/1974 | Windsor | 144/34.5 |

(Continued)

FOREIGN PATENT DOCUMENTS

| | | | | |
|---|---|---|---|---|
| EP | 1891852 A1 | 2/2008 | | |
| FR | 2816802 A1 | * 5/2002 | ............... | A01G 3/00 |

(Continued)

OTHER PUBLICATIONS

International Search Report, dated Jul. 16, 2009, from corresponding PCT application.

*Primary Examiner* — Thomas B Will
*Assistant Examiner* — Joan D Misa
(74) *Attorney, Agent, or Firm* — Young & Thompson

(57) ABSTRACT

Device and method for the separation of a part of a crop. The crop part is gripped with the use of a construction including the separation elements, such as cutting blades. The gripping of the crop part is performed with the use of two rollers between which the crop part is received. The crop part is subsequently gripped between the rollers and this construction moves along the crop part to an optimal position for the separation of the crop part from the rest of the crop.

15 Claims, 4 Drawing Sheets

(56) References Cited

U.S. PATENT DOCUMENTS 4,069,652 A * 1/1978 Carlson .................... 56/328.1
4,292,982 A * 10/1981 Butcher .................... 460/136
RE31,481 E * 1/1984 Choat ...................... 144/34.5
5,331,980 A * 7/1994 Bailey ..................... 131/290

FOREIGN PATENT DOCUMENTS

| GB | 673306 A | 6/1952 |
| GB | 2160403 A | 12/1985 |
| NL | 2000333 C2 | 11/2007 |

* cited by examiner

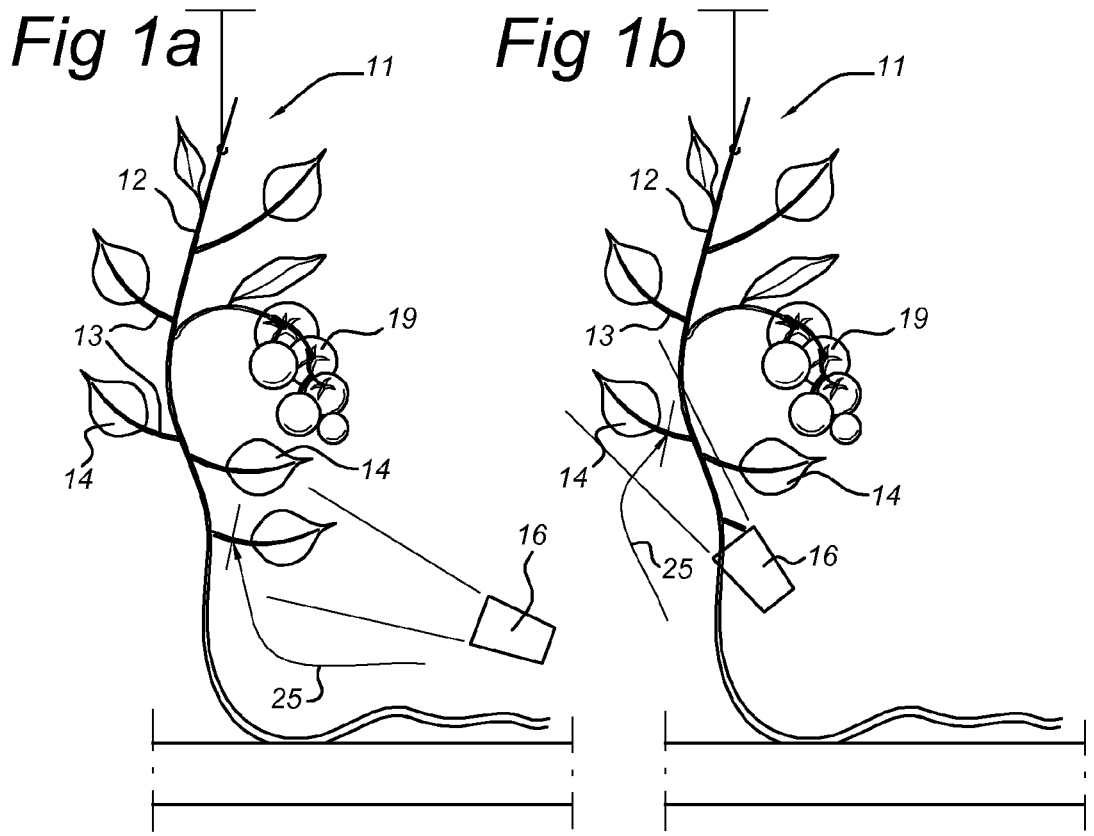
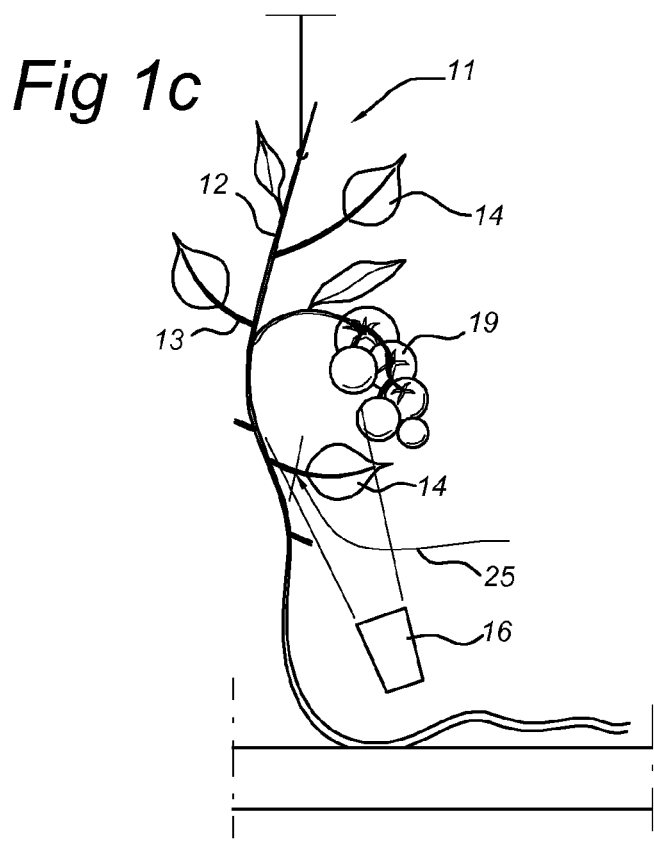

DEVICE AND METHOD FOR THE REMOVAL OF A PART OF A CROP

BACKGROUND OF THE INVENTION

1. Field of the Invention

The present invention relates to a device for the removal of part, such as leaf or fruit, from the rest of the crop. The invention relates, for example, to the removal of leaves, fruits and the like from crops, such as tomatoes and cucumbers and the like. To achieve this, there are various proposals in the prior art for the removal of leaves, fruits and the like with the use of a robotic arm to which cutting systems are attached. The robotic arm is moved into the crop and vision techniques are applied to perform separation between the crop and the relevant part of the crop at the desired point.

2. Description of the Related Art

However, the problem often arises that it is not quite possible to separate the part from the rest of the crop at the desired point.

In the case of tomatoes and other crops, for example, it is desirable for the leaves to be removed as close to the main stem as possible. This means that the stalk of the leaf must be cut as close as possible to its attachment to the main stem. If a robot with a cutting blade is moved through the crop, it is often not possible to reach such a position. If force is exerted on the arm in order to reach the required position as yet, this generally only results the main stem being pushed aside. This means that the crop is subjected to undesirable loads and that the objective in mind, i.e. to reach the optimal position separation, is not achieved.

A harvesting device for the harvesting of tea leaves is known from GB 673306, wherein the upper side of a crop is engaged between two rollers and tilted. Cutting in a lower position of the relevant part of the crop is then performed. By gripping the part of the crop between the two rollers, the position of the cutting device does not change.

BRIEF SUMMARY OF THE INVENTION

The object of the present invention is to provide a method and device with which the desired separation point van be reached in the best possible manner, after which separation can actually be performed at that point.

This objective is achieved with the device as described above, wherein the cutting means are attached in such a manner that the cutting point of said part lies in the extension of the nip.

According to the present invention, the relevant part of the crop is engaged, after which movement of the separation means, such as a blade, takes place relative to such part of the crop. This is a positive displacement, meaning that it is possible for the robot with the gripping means (end effector) to move further towards the main stem, but it is also possible to draw the stalk closer to the robot with the end effector (or combinations of both). However, in both cases, the part of the crop itself is taken as the point of reference for selecting the possible cutting position. Accordingly, the situation no longer arises in which it is not possible for the part of the crop to be gripped at the required point of separation. According to the invention, the crop is not cut off or tilted, and cutting takes place in line with the direction in which it is moved into the pinch. Cutting preferably takes place at a point located between the main stem and the nip, i.e. upstream of the nip. To this end, during this operation the cutting means are preferably positioned in the placement direction of the device, in front of the nip.

According to a particular embodiment of the invention, the relevant crop part is not released after separation, for example, by cutting or clipping, but is positively disposed of.

The rotatable elements may have any conceivable shape. It is thus possible for the them to be constructed elliptically. It is also possible for the rollers to be constructed cylindrically and to provide them with a flattened section. The rollers preferably consist of a flexible material. If a flat-sectioned embodiment of the rollers is applied, as the flat-sectioned portions of the two rollers lie opposite one another, a clearance arises between into which the stalk part can be received. During rotation of the rollers, the stalk part between the rollers is enclosed and held firmly by the rollers. Subsequently, the movement of the stalk part, as described above, with regard to the arm upon which the rollers are attached can take place. The end position, i.e. the end of the movement of the crop part with regard to the rollers, is determined either by reaching the maximum gripping force or by reaching an abudment Rotation of the rollers is preferably discontinuous.

In the first case, in particular in the embodiment of the symmetrically constructed rollers, such as rollers with the flat-sectioned portions, rotation is continued to a maximum until there appears to be no more engagement action. In the second case, the maximum gripping force of the crop part, for example, can be measured by the energy consumption in the motor of the rollers. If this exceeds a given maximum value, no further movement of the crop part and rollers may take place.

The rollers are preferably jointly connected by mechanical means.

For further fixation of the leaf part, there is an accomodation for receiving the stalk part in the extension of the nip between the rollers, where the stalk part is to be received, on one or more sides thereof. One of these accomodations is embodied in such a manner that it can act cooperatively with the cutting edge of a blade, such that the stalk part can be removed from the main stem at the desired point. This blade, and more specifically the outer edge thereof, extends substantially parallel from the centerline of a roller.

It is also possible, however, to attach a blade or any other separation means at both sides, so that the construction can be easily placed in the best possible position with regard to the stalk of the leaf or the fruit. The drive means of the rollers is preferably located centrally and is at a considerable distance from the rollers, for example at a distance of 20 centimeters.

It will be understood, however, that the above-described embodiments are merely exemplary. The drive means of the rollers or other electrical elements may be constructed in any conceivable manner.

According to a further particular embodiment of the invention, the rollers have essentially the same diameter and, more specifically, are practically identical.

It is possible with this invention to engage to clip a (leaf) stalk in a specific manner.

The robot to which the gripping means are attached may be constructed in any conceivable manner. Examples include a (telescopic) robot arm, a robot operating with three spokes, and so forth.

BRIEF DESCRIPTION OF THE DRAWINGS

FIG. 1a-c shows a schematic, perspective view of an example of the separation of a leaf;

Figure 2:
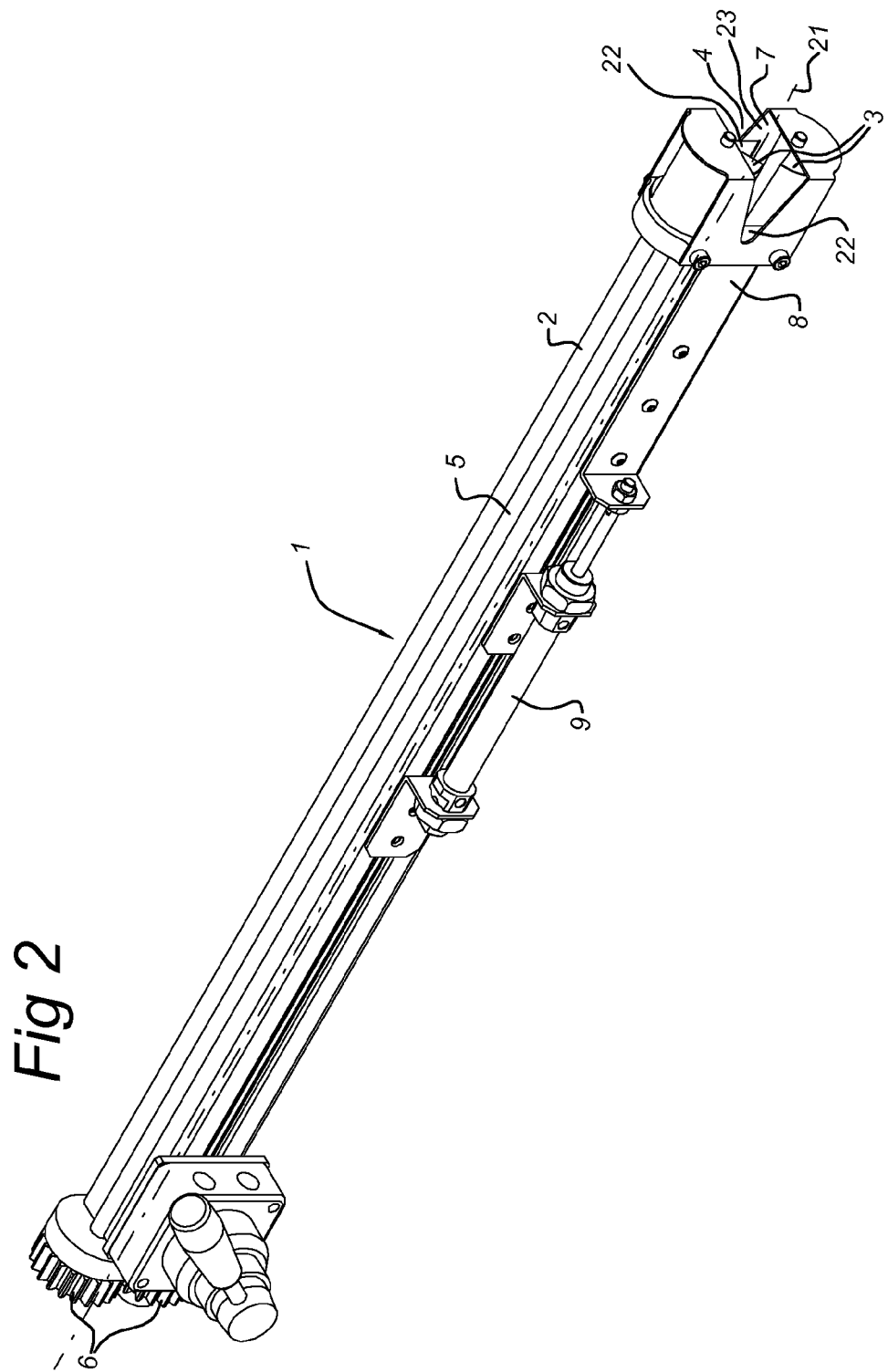
FIG. 2 shows a number of stems from which leaf parts need to be removed with the aid of a schematically illustrated arrangement according to the invention.

The method according to the invention will be described schematically in more detail with reference to FIG. 1a-c.

DETAILED DESCRIPTION OF THE PREFERRED EMBODIMENTS

In FIG. 1 a crop 11 is indicated, comprising a central stem 12, a number of leaves 14 joined to the main stem by a stalk 13 and fruits 19. It will be understood that, depending on the crop in question, the main stem 11 can have any conceivable shape and the same applies to the other parts of the crop. A schematically depicted camera 16 is present, whilst arrow 25 indicates a separation operation.

As is evident from FIG. 1a, the camera 16 is positioned (obliquely) beneath the crop (for example at an angle of 45°). The crop is observed from beneath and, as is evident from FIG. 16, the camera sees the first, lowest leaf 14. The separation means, an example of which will be given hereinafter, are subsequently moved into the field of vision of the camera 16 in order to remove the stalk 13 from the lowest leaf 14 of the crop.

This removal not only comprises the separation of the stalk and stem, for example, by cutting or clipping, but also the removal of the leaf and stalk thus obtained away from the crop.

Subsequently, the situation as given in FIG. 1b results. As the camera 16 operates, the next leaf 14 is then observed unobstructed, as opposed to the situation in 1a. Again, a schematically depicted separation operation of the relevant leaf 25 is performed, as indicated by the arrow 25.

Subsequently, the situation as shown in FIG. 1c results. Here, camera 16 distinguishes between fruits 19 and the leaf 14 located above and this leaf 14 will be subsequently removed, but not the fruit 19, according to the arrow 25. The leaves are stripped from the crop in this manner step-by-step until the desired degree of leaf removal is achieved. It will be understood that different cameras 16 can be used.

In FIG. 2, a (robot) arm 1 is indicated as an example according to the present invention. This comprises a frame 2 which accommodates the various parts to be described hereinafter. Two roller elements 3 are arranged opposite one another. The rollers are not complete, but are each provided with a recess 4. In the position as shown in FIG. 1, this creates a considerable clearance between the roller elements 3, as shown in FIG. 1, and this clearance is indicated by numeral 23. This clearance is delimited on both sides by an accomodation 7.

Each of the roller elements is connected to a gearwheel 6 via a shaft 5. The gearwheels 6 engage one another, thus ensuring the synchronised rotation of the roller elements 3. There is a common drive motor, not depicted in detail, which is controlled by a control unit not depicted here and described hereinafter. When the roller elements rotate, the distance 23 decreases until the outer surfaces of the roller elements come to rest upon each other. The roller elements preferably comprise a deformable material such as a rubber material, thus enabling a crop part positioned in between, such as a part of a stalk to be described hereinafter, to be gripped in a firm manner.

One or both of the accomodations 7 is constructed in such a manner that a blade 8 with a cutting edge 22 can move reciprocally along it. The drive unit for this blade 8 is driven, for example, by a pneumatic cylinder 9 which is also controlled by the control system 17, not shown here. The arm 1 is elongated in shape and has a longitudinal shaft 21. It will be understood that the arm depicted here is merely exemplary. This can be constructed telescopically, for example, but can also form part of any other movable construction. For the present separation device, only the end part of the arm and its drive system are of primary importance.

Figure 3:
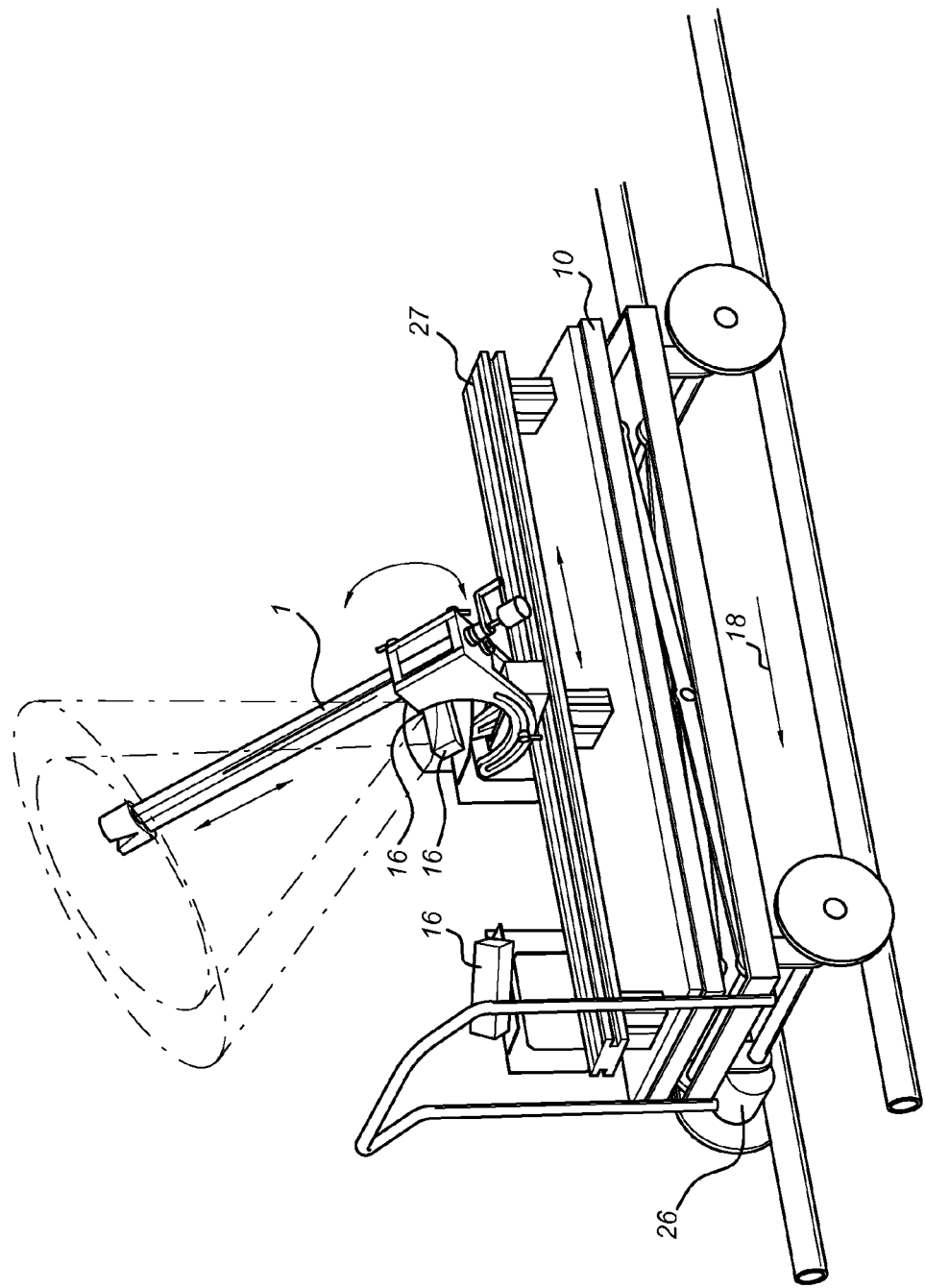
FIG. 3 shows the arm according to the present invention during the uptake of a stalk member.

FIG. 3 shows a schematic arrangement of a device according to the invention. This comprises a trolley 10, such as a pipe-rail trolley, with its own drive 26. Three cameras 16 are arranged on the trolley, wherein, in this example, only two cameras positioned adjacent to one another are effective. Furthermore, the arm 1 according to the invention is mounted on this trolley and this is movable in respect of the trolley with a sled construction 27. It will be evident from FIG. 3 that the operational range of the arm 1 corresponds approximately to the operational range of camera 16, so that any obstacles in the way of the arm 1 will be observed by the camera 16.

According to the invention, the trolley 10 is moved in the direction of the arrow 18 to the lower side of the main stem 12 of one of the crops. The cameras 16 then become active and observe the crop from beneath. This observation is performed in a cone shape. With vision techniques, it is then determined where a stalk of a leaf to be removed is located. The arm 7 is subsequently manipulated with the control unit 17. It will be understood that a mechanism is present (not shown) in order to move the arm 7 through some distance in the vertical direction. Manipulation at an angle is also possible. Likewise, all other conceivable movements are possible, such as rotation about the horizontal and vertical axis and translation along the longitudinal axis.

Figure 4:
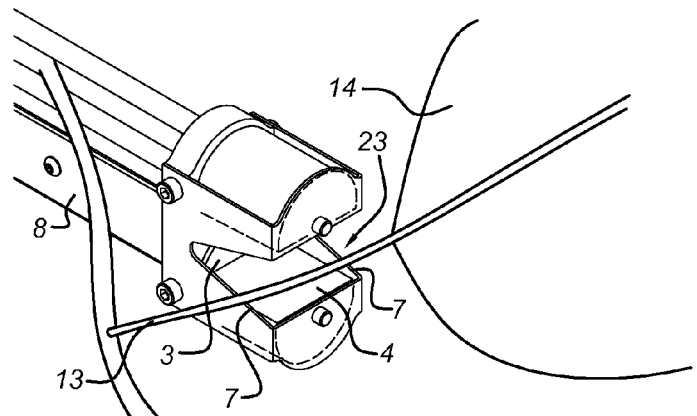
FIG. 4 shows the stripping means according to the present invention during the clamping of a stalk member.
Figure 5:
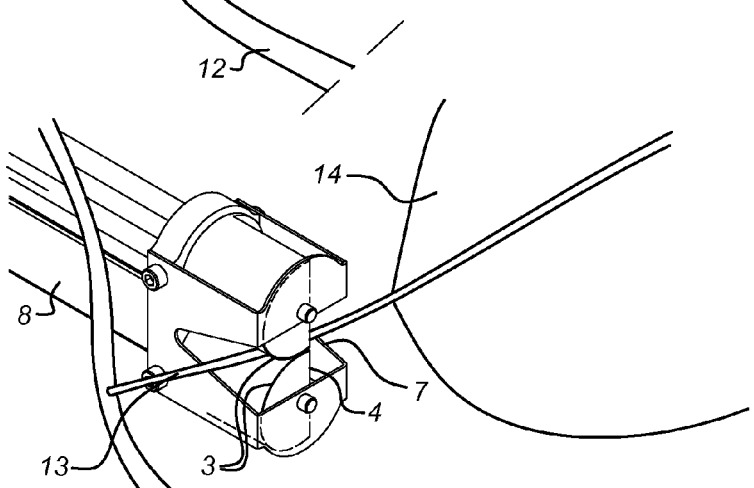
FIG. 5 shows the separation means according to the present invention during the clamped movement of a stalk part according to the present invention.

FIG. 4 shows the result of the foregoing in more detail. Arm 1 approaches the stalk 13 in the most optimum manner, i.e. in the manner giving the greatest chance of gripping the stalk 13. This will generally be close to the attachment between the leaf 14 and the main stem 12. The roller elements are in the position as shown in FIG. 1, i.e. there is a relatively large opening 23 between the roller elements. The stalk is received in this opening and in the accomodations 7. Although this position is the most optimum for gripping the stalk, this position is not the desired position for separating the stalk from the main stem. To achieve this, it is necessary to choose a point closer to the main stem 12. In order to achieve this, the roller elements are subsequently rotated with the aid of the control unit 17. This causes the pinch 23 between the roller elements to decrease until the stalk is eventually gripped. This is shown in FIG. 5. On further rotation, the gripping action on the stalk will pull on the stalk. This occurs until the device comes into contact with the stem.

With this motion, the other parts of the crop will be pushed out of the way without causing damage.

Figure 6:
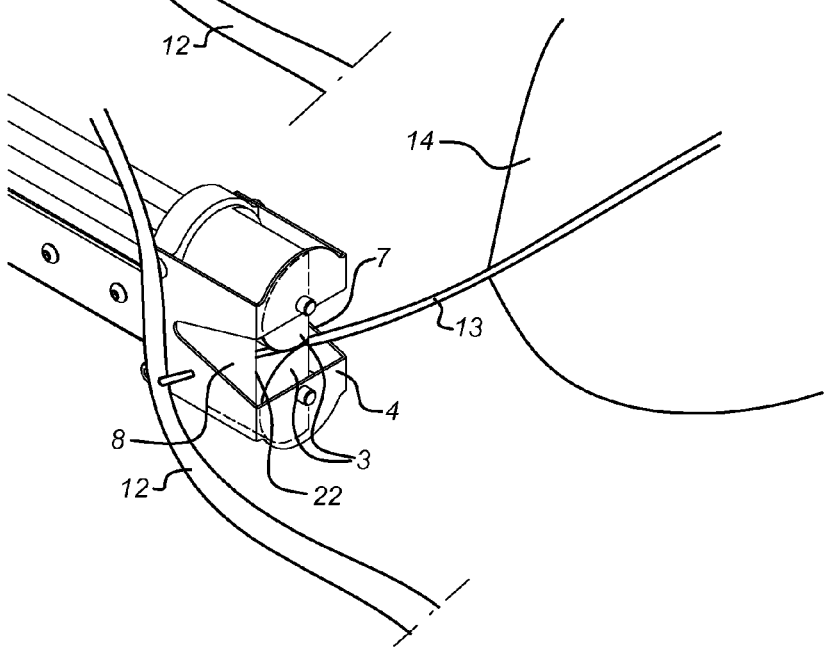
FIG. 6 shows the cutting of the stalk member from the main stem using the device according to the invention.

When the arm has reached the most optimum position on the stalk for separating the stalk from the main stem 12, cutting is performed as shown in FIG. 6. The blade 8 located closest to the main stem is used for this purpose. The stalk remains held in the pinch between the two rollers 3. The arm is subsequently moved away from the crop and the leaf is released again by rotation of the rollers 3. It is possible, for example when harvesting fruits, to enable other blades to become actively deployed, after the separation of the fruit from the rest of the crop and, for example, after placing the fruit in a holder. This enables the removal of the crushed stalk part of the fruit gripped between the roller elements.

After reading the foregoing, those skilled in the art will become readily aware of alternative embodiments. These fall within the scope and spirit of the appended claims and are evident according to the foregoing description. It is possible, for example, for the rollers to have an elliptic shape.

The invention claimed is:

1. A device for the separation from a crop of a crop part comprising a carrier with a movable arm provided with gripping means for said part of the crop, and cutting means for said crop part, said gripping means comprising rotatable elements disposed opposite one another, between which a nip is delimited for the uptake of said crop part to be removed,
wherein said crop part can be received in the nip and engaged by the rotatable elements, after which the movement of said crop part can take place relative to the cutting means by rotating the rotatable elements,
wherein said cutting means are arranged such that a cutting point of said crop part lies in the extension of said nip.

2. The device according to claim 1, wherein said rotatable elements comprise roller elements.

3. The device according to claim 2, wherein the roller elements comprise a flat-sectioned portion.

4. The device according to claim 2, wherein the roller elements are elliptically shaped.

5. The device according to claim 1, wherein said cutting means comprise a movable blade having a cutting edge which can be moved along the extension of said nip.

6. The device according to claim 5, comprising two cutting blades located at a distance from one another.

7. The device according to claim 1, wherein an accommodation is provided in a tangential line of projection of said nip for said crop part to be removed.

8. The device according to claim 1, wherein a drive means of said rotatable elements are disposed at a distance of at least 20 cm from said rotatable elements.

9. The device according to claim 1, wherein said carrier comprises a movable part of a robot.

10. A method for the separation from a crop of a crop part comprising:
gripping said crop part by gripping means, the gripping means being comprised by a movable arm of a carrier of a device for the separation from a crop of a crop part, the gripping means comprising rotatable elements disposed opposite one another, between which a nip is delimited for the uptake of said crop part to be removed, wherein said crop part is received in the nip and engaged by the gripping means, wherein after gripping said crop part, said crop part is moved in relation to the cutting means by rotating the rotatable elements before separation is performed; and
separating said crop part from the crop by cutting means, at a point in close proximity to the main stem of said crop,
wherein a cutting point of said crop part lies in the extension of said nip.

11. The method according to claim 10, wherein the crop part is attached by a stalk to the main stem of the crop, wherein said separation comprises positioning of the cutting means in close proximity to the stalk of the main stem.

12. The method according to claim 11, wherein the positioning comprises moving said crop part, whilst said crop part is gripped, towards the cutting means.

13. The method according to claim 10, wherein said separation comprises cutting or clipping.

14. The method according to claim 10, wherein said crop part remains gripped after the separating and is transported out of the range of the crop.

15. The method according to claim 10, wherein said separation comprises separation at two spaced positions on the crop part.

* * * * *

UNITED STATES PATENT AND TRADEMARK OFFICE
CERTIFICATE OF CORRECTION

PATENT NO. : 8,641,495 B2  
APPLICATION NO. : 12/937879  
DATED : February 4, 2014  
INVENTOR(S) : Kneppers et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 570 days.

Signed and Sealed this
Twenty-second Day of September, 2015

Michelle K. Lee
*Director of the United States Patent and Trademark Office*